(12) United States Patent
Van Rens (10) Patent No.: US 11,542,053 B2
(45) Date of Patent: Jan. 3, 2023

(54) HEATING MEANS FOR A FLOW WRAPPER (71) Applicant: GEA Food Solutions Weert B.V., RV Weert (NL)

(72) Inventor: Joseph Johan Maria Van Rens, BK Weert (NL)

(73) Assignee: GEA FOOD SOLUTIONS WEERT B.V., RV Weert (NL)

( * ) Notice: Subject to any disclaimer, the term of this patent is extended or adjusted under 35 U.S.C. 154(b) by 367 days.

(21) Appl. No.: 16/611,356

(22) PCT Filed: May 4, 2018

(86) PCT No.: PCT/EP2018/061489
§ 371 (c)(1),
(2) Date: Nov. 6, 2019

(87) PCT Pub. No.: WO2018/206424
PCT Pub. Date: Nov. 15, 2018

(65) Prior Publication Data
US 2020/0079544 A1    Mar. 12, 2020

(30) Foreign Application Priority Data

May 10, 2017 (EP) .................................. 17170393

(51) Int. Cl.
*B65B 63/08* (2006.01)
*B29C 65/10* (2006.01)
(Continued)

(52) U.S. Cl.
CPC .............. *B65B 63/08* (2013.01); *B29C 65/10* (2013.01); *B29C 66/4312* (2013.01);
(Continued)

(58) Field of Classification Search
CPC ................ B29C 65/10; B29C 65/7891; B29C 65/7894; B29C 66/1122; B29C 66/4312;
(Continued)

(56) References Cited

U.S. PATENT DOCUMENTS

| | | | | |
|---|---|---|---|---|
| 320,648 A | * | 6/1885 | Gibson | F24H 3/004 237/7 |
| 983,566 A | * | 2/1911 | Preuss | F24H 3/00 126/106 |
| 1,182,688 A | * | 5/1916 | Kirby | F24H 3/004 392/378 |
| 1,334,741 A | * | 3/1920 | Dundon | F24H 3/08 126/104 R |
| 1,362,579 A | * | 12/1920 | Lee | F24H 3/08 126/104 A |

(Continued)

FOREIGN PATENT DOCUMENTS

| | | |
|---|---|---|
| EP | 1634545 A1 | 3/2006 |
| EP | 1923202 A1 | 5/2008 |

(Continued)

OTHER PUBLICATIONS

International Search Report and Written Opinion for International Application PCT/EP2018/061489, dated Aug. 6, 2018.
International Preliminary Report on Patentability for International Application PCT/EP2018/061489, dated Jul. 11, 2019.

*Primary Examiner* — Robert F Long
*Assistant Examiner* — Eduardo R Ferrero
(74) *Attorney, Agent, or Firm* — The Dobrusin Law Firm, P.C.

(57) ABSTRACT

The invention relates to improvements of a heating means particularly in a vertical flow-wrapper.

13 Claims, 6 Drawing Sheets

(51) Int. Cl.
   *B29C 65/00* (2006.01)
   *B65B 9/20* (2012.01)
   *B65B 51/30* (2006.01)
   *F28F 7/02* (2006.01)
   *B29L 31/00* (2006.01)
(52) U.S. Cl.
   CPC ...... *B29C 66/73921* (2013.01); *B29C 66/849* (2013.01); *B29C 66/91231* (2013.01); *B29C 66/91421* (2013.01); *B65B 9/20* (2013.01); *B65B 51/30* (2013.01); *F28F 7/02* (2013.01); *B29L 2031/7128* (2013.01)
(58) Field of Classification Search
   CPC .......... B29C 66/4322; B29C 66/73921; B29C 66/80; B29C 66/849; B29C 66/9121; B29C 66/912331; B29C 66/91421; B29C 66/9161; B29C 66/9153; B29L 2031/7128; B65B 9/20; B65B 51/30; B65B 63/08; B65B 2051/105; F28D 2001/0273; F28D 7/04; F28D 7/08; F28D 7/005; F24H 3/00; F24H 3/02; F24H 3/06; F24H 3/065; F24H 3/08
   USPC .......................................................... 126/99 c
   See application file for complete search history.

(56) References Cited

U.S. PATENT DOCUMENTS

| | | | | | |
|---|---|---|---|---|---|
| 1,389,408 | A * | 8/1921 | Wilputte | .................. | F24H 3/08 126/104 A |
| 1,626,576 | A * | 4/1927 | Weideman | ................ | F24H 3/08 126/116 R |
| 1,724,752 | A * | 8/1929 | Deemar | .................... | F24H 3/08 126/90 A |
| 2,180,532 | A * | 11/1939 | Lee | ........................... | F24H 3/08 126/11 OR |
| 2,237,054 | A * | 4/1941 | Jensen | ...................... | F24H 3/08 126/101 |
| 2,494,113 | A * | 1/1950 | Whitaker | .................. | F24H 3/08 126/109 |
| 2,528,623 | A * | 11/1950 | Vicard | ...................... | F24H 3/08 126/99 R |
| 2,611,585 | A * | 9/1952 | Boling | ...................... | F28F 1/10 165/169 |
| 2,626,783 | A * | 1/1953 | Fritzberg | .................. | F24H 3/08 165/142 |
| 2,764,391 | A * | 9/1956 | Pullen | ...................... | F24H 3/08 165/122 |
| 3,709,473 | A * | 1/1973 | Ito | ............................. | F24H 3/08 122/18.3 |
| 3,848,665 | A * | 11/1974 | Uerlichs | ................... | F28F 3/12 165/168 |
| 4,103,473 | A * | 8/1978 | Bast | .................... | B65D 81/3261 156/497 |
| 4,161,980 | A * | 7/1979 | Ruger | ................... | H01L 23/473 257/E23.098 |
| 4,170,055 | A * | 10/1979 | Zethraeus | ................ | B23P 15/26 29/726 |
| 4,196,075 | A * | 4/1980 | Bentley | ................ | A61M 1/1629 210/321.74 |
| 4,215,743 | A * | 8/1980 | Margittai | ................ | F28D 7/026 165/155 |
| 4,218,863 | A * | 8/1980 | Howard | .................. | B29C 65/10 53/547 |
| 4,350,003 | A * | 9/1982 | Greenawalt | ............ | B29C 65/10 156/251 |
| 4,511,426 | A * | 4/1985 | Linner | ................... | B29B 13/025 156/497 |
| 4,512,138 | A * | 4/1985 | Greenawalt | ............ | B29C 65/02 219/243 |
| 4,601,040 | A * | 7/1986 | Andrews | .................. | B01D 8/00 165/110 |
| 4,601,694 | A * | 7/1986 | Ausnit | ................ | B29C 66/1122 493/381 |
| 4,606,174 | A * | 8/1986 | Berg | ...................... | B65B 9/2049 53/451 |
| 4,734,149 | A * | 3/1988 | Brown | .................... | B29C 65/10 156/499 |
| 4,747,450 | A * | 5/1988 | Ikegame | ................ | H01L 23/473 257/E23.098 |
| 4,796,696 | A * | 1/1989 | Stocton | ..................... | F28D 1/06 604/113 |
| 5,046,481 | A * | 9/1991 | Warwick | .................. | F24B 7/005 126/522 |
| 5,202,023 | A * | 4/1993 | Trimmer | .............. | B01D 63/024 210/321.89 |
| 5,322,579 | A * | 6/1994 | Van Erden | .......... | B29C 66/0242 156/66 |
| 5,326,537 | A * | 7/1994 | Cleary | ...................... | B09C 1/06 422/204 |
| 5,412,924 | A * | 5/1995 | Ausnit | ...................... | B65B 9/20 53/133.4 |
| 5,425,216 | A * | 6/1995 | Ausnit | ...................... | B65B 9/20 53/139.2 |
| 5,592,822 | A * | 1/1997 | Stubbs | ...................... | F25B 9/02 250/352 |
| 5,785,247 | A * | 7/1998 | Chen | .................... | B29C 45/1734 239/135 |
| 5,930,983 | A * | 8/1999 | Terminella | .............. | B65B 9/213 53/436 |
| 6,038,839 | A | 3/2000 | Linkiewicz | | |
| 6,044,837 | A * | 4/2000 | Tyler | ...................... | F24H 3/065 122/250 R |
| 6,655,110 | B2 * | 12/2003 | Taylor | .................... | B65B 9/2042 53/373.9 |
| 7,328,697 | B2 * | 2/2008 | Turner | .................... | F23C 3/002 126/91 A |
| 7,610,951 | B2 * | 11/2009 | Friese | .................... | F28F 9/0229 165/108 |
| 8,302,764 | B2 * | 11/2012 | Johnson | ................ | B65G 21/18 198/850 |
| 10,024,572 | B1 * | 7/2018 | Stephens | ................ | F28D 1/0472 |
| 10,274,265 | B2 * | 4/2019 | Kenworthy | ............ | F28F 1/022 |
| 2007/0144716 | A1 * | 6/2007 | Doh | ...................... | B01D 65/003 165/158 |
| 2009/0114380 | A1 * | 5/2009 | Grabon | ..................... | F28D 7/04 165/181 |
| 2010/0096115 | A1 * | 4/2010 | Erickson | ................ | F28D 7/024 165/156 |
| 2011/0174470 | A1 * | 7/2011 | Chang | ..................... | F28D 7/04 165/163 |
| 2012/0036886 | A1 * | 2/2012 | Seybold | ................ | F25B 40/00 165/164 |
| 2014/0262137 | A1 * | 9/2014 | McBay | ............... | F28D 20/0034 165/45 |
| 2015/0076410 | A1 * | 3/2015 | Schlichting | ............. | B01J 8/065 422/208 |
| 2016/0054071 | A1 * | 2/2016 | Cordova | ............... | F28D 7/0008 165/164 |
| 2016/0069589 | A1 * | 3/2016 | Kim | .................... | F28D 15/0233 392/358 |
| 2016/0153719 | A1 * | 6/2016 | Tokuda | ................ | F28D 21/0003 165/140 |
| 2017/0328651 | A1 | 11/2017 | Rozga et al. | | |

FOREIGN PATENT DOCUMENTS

| | | |
|---|---|---|
| EP | 3124906 A1 | 2/2017 |
| GB | 2014417 A | 8/1979 |

* cited by examiner

HEATING MEANS FOR A FLOW WRAPPER

CROSS-REFERENCE TO RELATED APPLICATIONS

This application is a U.S. National Phase application under 35 U.S.C. § 371 of International Application No. PCT/EP2018/061489, filed on Nov. 6, 2019 and which claims benefit to EP Application No. 17170393.7, filed on May 10, 2017.

FIELD

The invention relates to improvements of a heating means particularly in a vertical flow-wrapper.

BACKGROUND

A common method of making bags out of a foil web is the use of a vertical flow-wrapper. Such a packaging machine receives a continuous flat sheet, a foil of plastic material, e.g. a thermoplastic material, which is transported continuously or intermittently and passed downwardly over a form shoulder and is then shaped into a tubular form, i.e. into a foil tube, by being wrapped around a vertical form-fill tube of the packaging machine. After being wrapped around the vertical form-fill tube, the foil web is longitudinally closed by means of a longitudinally extending seal which is applied to the foil especially by heat sealing the lateral/longitudinal margins of the foil web or by heat sealing in the vicinity of these margins thereby joining them. This is carried out by so called longitudinal-sealing means. The foil tube has conventionally a rectangular, elliptical or a circular cross-sectional area. Conventionally, the foil tube is closed by cross-sealing means, preferably in a direction perpendicular to the direction of flow, i.e. transversely. Thereby, individual bags are defined out of the continuous foil tube. A product, such as a foodstuff, is introduced by dropping the product through a form-fill tube and into the foil tube surrounding the form-fill-tube. During filling, the foil tube is transversely open at its upper end, i.e. not cross-sealed. Thereafter and/or simultaneously, the foil tube together with the product is moved downwardly and then a top cross-seal is formed above the product and thereby a hermetically closed bag produced. As a last step or simultaneously to the application of the top seal, the bag is separated from the foil tube by cutting means. For providing the longitudinal seal, the two ends of foil web must be heated uniformly without increasing the overall length of machine and/or without reduction of the transportation speed of the film web.

SUMMARY

It is therefore the purpose of the present invention to provide an improved heating means, particularly for a packaging machine and to provide an improved packaging machine.

The problem is attained with a heating means with a heating element and a tube through which a medium to be heated flows, characterized in, that the tube is incorporated into a block of a solid-state thermo-conductive material.

The present invention relates to a heating means to heat up a medium, preferably a gas, even more preferably air. The medium is preferably ejected out of the heating means and for example utilized to heat a film, preferably prior to sealing. The film preferably moves relative to the heating means. This heating means comprises a heating element, for example an electrical heating element, particularly a cartridge heater. The heating elements heats a block, which is made from a solid, thermal-conductive material—A preferred material for the block is a material that comprises at least partially metal, such as aluminum, copper, iron or a material with equivalent thermo-conductive properties. According to the present invention, into this block a tube is incorporated, through which the medium to heated flows; i.e. the block forms the circumference, the sidewalls, of the tube.

Preferably, the heating means comprises a least one, preferably a multitude of outlets, through which the heated medium leaves the heating means. Preferably, these outlets are incorporated into the solid-state block. According to a preferred embodiment, the outlet is a nozzle incorporated in the block.

According to a preferred or another inventive embodiment of the present invention, the block of the heating means is a 3D-print, i.e. the solid-state body comprises the tube, the outlet(s) and preferably the opening for the heating element, preferably without being machined. The block is built up layer by layer by means of the so-called 3D-printing technology. The printing material is in the present case a powdery material which is provided layer by layer to build the body and adhesively connect the present layer to the previous layer, for example by heat and/or an adhesive material such as a glue. The power preferably comprises one or more of the above-mentioned materials.

The tube through which the medium flows and in which it is heated, preferably comprises a spiral-shaped part. More preferably, the spiral-shaped part is designed such that a counter flow of the medium to be heated is provided. This preferred embodiment of the present invention results in a very short heating means and/or in a very low residence time of the medium in the heating means.

Preferably, downstream of the spiral part there is a closed loop pressure chamber provided. This chamber is preferably designed as a tube, whose cross section is preferably significantly smaller than its length. In the pressure chamber the pressure is preferably essentially the same everywhere in the pressure chamber.

Preferably, each outlet of the block, through which the heated medium escapes from the heating means, is connected to the pressure chamber. Preferably, the connection between the outlet and the pressure chamber is provided in the block and more preferably part of the block. Preferably, the connection is provided during the 3D-printing-process.

According to a preferred embodiment of the present invention, each outlet is framed by two planes. The planes are preferably provided to the left and to the right of each outlet and provided at an angle relative to each other. Preferably, the angle is 90-130°, more preferably 92-120° and even more preferable 93-110°.

The inventive heating means can be adapted as needed for a certain application, for example a certain material and/or a shape of a bag that is produced on a packaging machine. For example, the form and/or number of nozzles and/or the shape of the block, particularly its cross-section is preferably adapted to and/or designed for the individual application, e.g. in order to optimize the pressure, the flow and the flow distribution of the medium leaving the heating means.

The following parameters can, for example be changed:
  the shape of the nozzle, particularly its cross-section and/or shape, preferably at its outlet.
  the diameter of the nozzle
  the length of the nozzle the outside surface of the block 10 adjacent to the nozzles 12 the angle α of the surface adjacent to the nozzles 12 number of holes the distance between nozzles distribution of the nozzles along the height H of.

Only one or a multitude of those adaptations can be carried out, wherein any combination of adaptations or modifications can be carried out for a certain application. Preferably, the changes are made at the computer and the changed block is then 3D-printed. Some adaptations, like the size, the number and/or the distribution of the nozzles can also be incorporated by machining, e.g. drilling.

In case the application is changed, for example the bag which is produced on a vertical flow-wrapper, the heating means is changed as well.

The problem is also solved with a packaging machine comprising the inventive heating means.

This subject matter of the present invention deals with a packaging machine, preferably a vertical flow wrapper. In a vertical flow wrapper, a continuous flat sheet, a foil of plastic material, e.g. a thermoplastic material, which is transported continuously or intermittently and passed downwardly over a form shoulder and then shaped into a tubular form, i.e. into a foil tube, by being wrapped around a vertical form-fill tube of the packaging machine. After being wrapped around the vertical form-fill tube, the foil web is longitudinally closed by means of a longitudinally extending seal which is applied to the foil especially by heat sealing the lateral/longitudinal margins of the foil web or by heat sealing in the vicinity of these margins thereby joining them. This is carried out by so called longitudinal-sealing means. The foil tube has conventionally a rectangular, elliptical or a circular cross-sectional area. Conventionally, the foil tube is closed by cross-sealing means, preferably in a direction perpendicular to the direction of flow, i.e. transversely. Thereby, individual bags are defined out of the continuous foil tube. A product, such as a foodstuff, is introduced into the foil tube by dropping the product through a form-fill tube and into the foil tube surrounding the form-fill tube. During filling the foil tube is transversely open at its upper end, i.e. not cross-sealed. Thereafter and/or simultaneously, the foil tube together with its product is moved downwardly and then a top cross-seal is formed above the product and thereby the hermetically closed bag produced. As a last step or simultaneously to the application of the top seal, the bag is separated from the foil tube by cutting means.

The inventive heating means is preferably provided upstream from a sealing means. The sealing means are preferably rolls, which are pressed together and hence apply pressure to the heated film, preferably its two opposing ends.

The packaging machine is preferably a vertical flow wrapper.

BRIEF DESCRIPTION OF THE DRAWINGS

The invention is disclosed referring to the figures of the attached drawings, by way of non-limiting examples.

DETAILED DESCRIPTION

Figure 1:
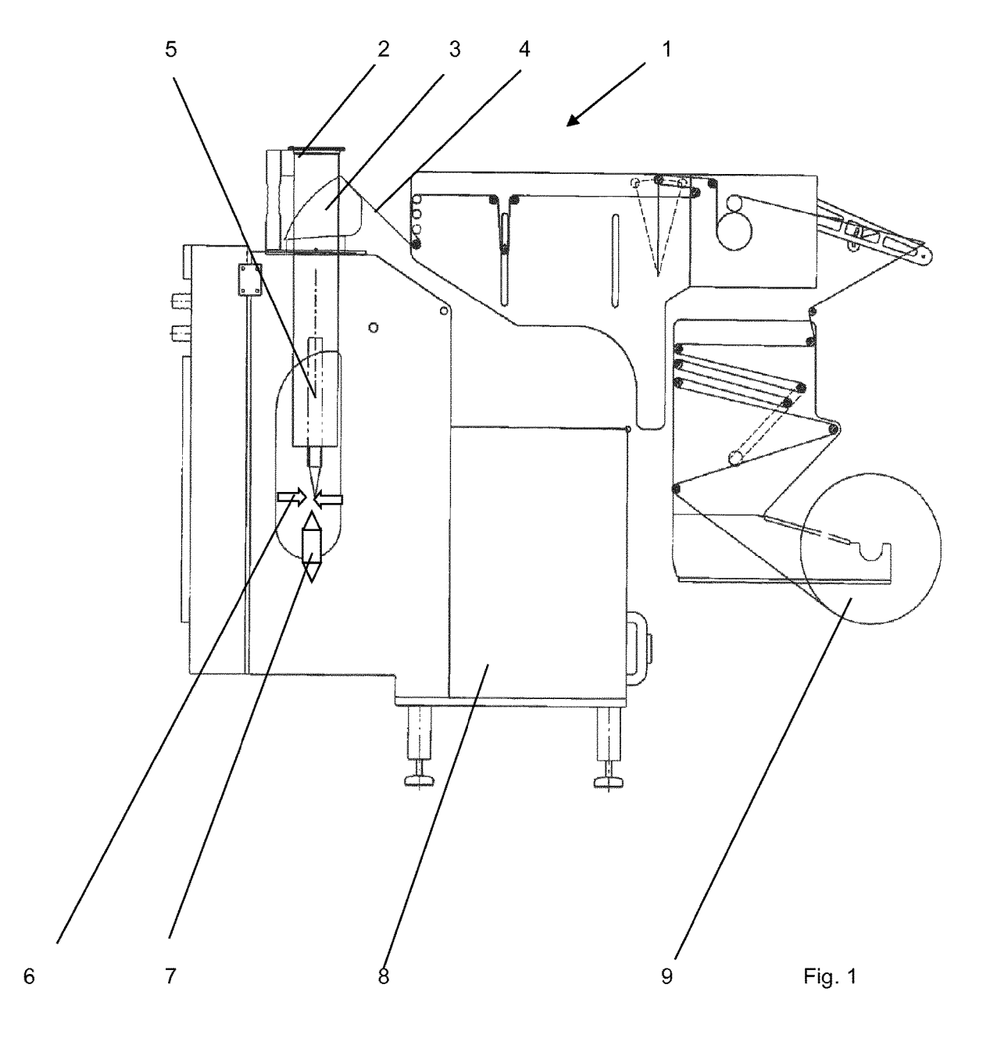
FIG. 1 shows schematically the vertical flow-wrapper according to the invention.

In FIG. 1, the vertical flow-wrapper 1 according to the invention is schematically shown. A vertical flow wrapper is a packaging machine, which forms a plane foil web into a foil tube, which is transported along a form-fill tube. Two opposing ends of this foil tube are sealed together by a longitudinal sealing means 5. Subsequently, the packaging item is filled into the foil tube and a cross-seal is applied to the foil tube to close the package. Simultaneously or after applying the cross-seal, the finalized packages are cut off the foil tube. The vertical flow wrapper comprises a frame/housing 8, at which a form shoulder 3, a form-fill tube 4 and longitudinal sealing means 5 and cross-sealing means 6 are provided. The vertical flow-wrapper may comprise gusset-forming means to form the bottom and/or the top of each bag. The longitudinal sealing means comprises means to heat the film and to press the two opposing ends together. Due to the heat and the pressure the films seal together. Preferred pressure means are rolls which can apply a pressure to the film-ends, while the film is moving. The heating means are provided upstream from the pressure means and preferably also heat the film while it is moving past the heating means. This is preferably done with a gas, preferably air, which is blown towards the film and hence heats the film. A possible heating means to heat the film prior to applying pressure is depicted in FIGS. 4-7.

A web of a foil 4, especially a weldable plastic foil 4, is supplied from a reel, which supplies the plane foil continuously or intermittently to a form shoulder 3, which shapes the foil web into a rather tubular form around a form-fill tube 2. In the context of the present invention, a "tubular form" of the bags or of the foil means any cross-sectional form including a circular form or another form, and especially a rectangular or generally a polygonal form. Longitudinal sealing means 5, which are provided downstream from the form shoulder, seal the edges to the foil tube together. After sealing, the bottom of the bag 7 can be formed by a special bottom forming means, for example gusset-forming means. Finally, cross seals, extending preferably perpendicularly to the direction of flow of the foil, are applied, especially by means of cross-sealing means 6. These cross sealing means 6 apply to the bag 7 not only a cross-seal closing the top of the bag 2, but these cross-sealing means 6 advantageously also provide, preferably simultaneously a cross-seal defining the bottom of the subsequent, upstream bag 2. The bags 2 produced are separated from one another by a cutting means, which are preferably incorporated into the cross-sealing means 6. Between the application of the bottom- and top-cross-seal of each bag, the bag is filled with the product, preferably an edible product.

Figure 2:
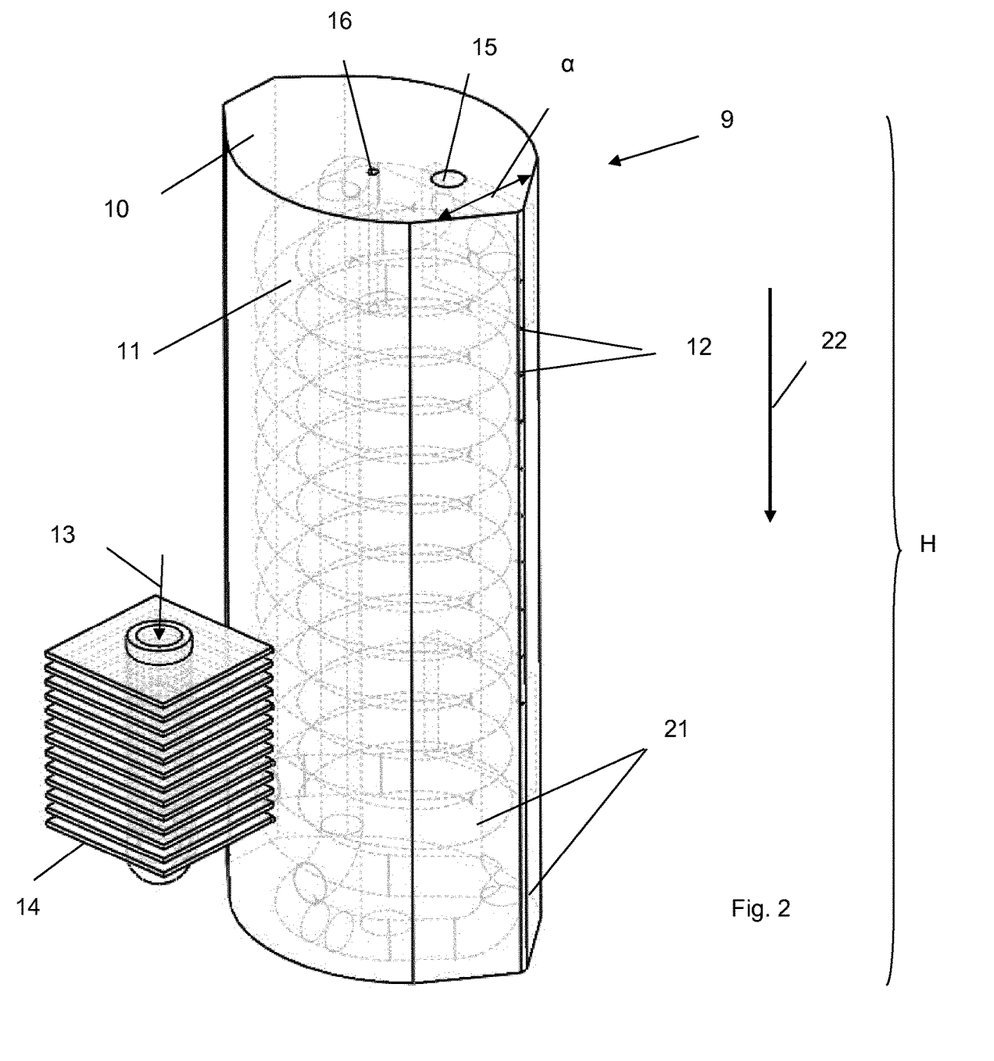
FIG. 2 shows the inventive heating means.

The film web 4 can be heated by utilizing the heating means as depicted in FIG. 2. FIG. 2 shows an overall image of the heating means 9, which essentially comprises a solid-state block 10. This solid state block is preferably produced by 3D-printing; i.e. the body is build up layer by layer. Each layer is connected to the previous layer by adhesive connection, for example by means of an adhesive and/or by the application of heat. The material utilized to produce the block is preferably a thermally conducting material, such as aluminum, an aluminum alloy, copper, iron and/or steal. For 3D-printing, the material is provided as a powder. Preferably, no machining is utilized after the block has been printed. As depicted by the dotted lines, in its inner, the block comprises a tube 11, through which the medium to be heat, preferably a gas, particularly air flows. This medium leaves the block via an outlet, here a multitude of outlets, here a multitude of nozzles, preferably provided along a line. Furthermore, in or around, here in the block, a heating means 15, here a cartridge is provided, which heats the entire block to a desired temperature. The heating is monitored and preferably controlled by a temperature sensor 16, for example a thermocouple. The medium enters the block, here via a separator 14, which avoids, that the tubes upstream from the separator are heated too much. Preferably this separator 14, the tube connection between the separator and the block 10 are provided as one piece and are more preferably all produced by means of 3D-printing during one and the same printing process. The medium enters the separator or the block 10 directly via an inlet 13, flows through the tubes, in which a heat transfer from the sidewalls of the tube 11 to the medium. After the medium has been heated, it exits the block via the outlet(s) 12. In the present case, the outlet is an array of nozzles which extend preferably equidistantly along a line, which is preferably parallel to the direction of motion 22 of a film past the heating means 9. It can be seen that the outlets, here, do not extend over the entire height of the block. However, there may be applications in which more nozzles are preferable. It has turned out that for the heating of a film, particularly in a vertical flow wrapper, it is advantageous that the outlets are framed by two planes 21 which extend parallel to the direction of motion 22 of the film 4. The planes are provided to the left and to the right of the array of outlets 12. The planes are preferably provided at an angle α, so that the cross-section of the block 10 is triangular shaped in the vicinity of the outlets with the outlets at the tip of the triangular. The outlets are preferably provided as nozzles which eject the medium towards the body to be heated, preferably a moving film.

FIGS. 3-7 shows details of the tube 10 and the outlets/nozzles 12. For the sake of clarity, the block 10 has been omitted. However, the person skilled in the art understands that the lines that delimit the tube and the outlets is the block 10 itself. Particularly from FIG. 5 it can be seen that the tube 10 comprises here a spiral part 17 and a pressure chamber 18. The gas enters the tube via inlet 13 and then flows through the spiral part. The flow-direction of the medium is depicted by a multitude of small arrows. In the present case, the spiral part 17 is designed such that there is a counter-flow of the medium in the spiral part. This assures more uniform heating of the gas and a shorter height H. Downstream of the spiral part a pressure chamber is provided, which is designed as a closed loop. Depending on the pressure distribution in the pressure chamber, the medium can flow in the pressure chamber in both directions. The outlets 12 are flow-wise connected to the pressure chamber. Due to closed loop design, there is no or no significant pressure drop along the array of outlets with the result, that the gas flow out of the various outlets is at least essentially equal. The fluid flow in the pressure chamber is also depicted by small arrows in FIG. 5.

Figure 3:
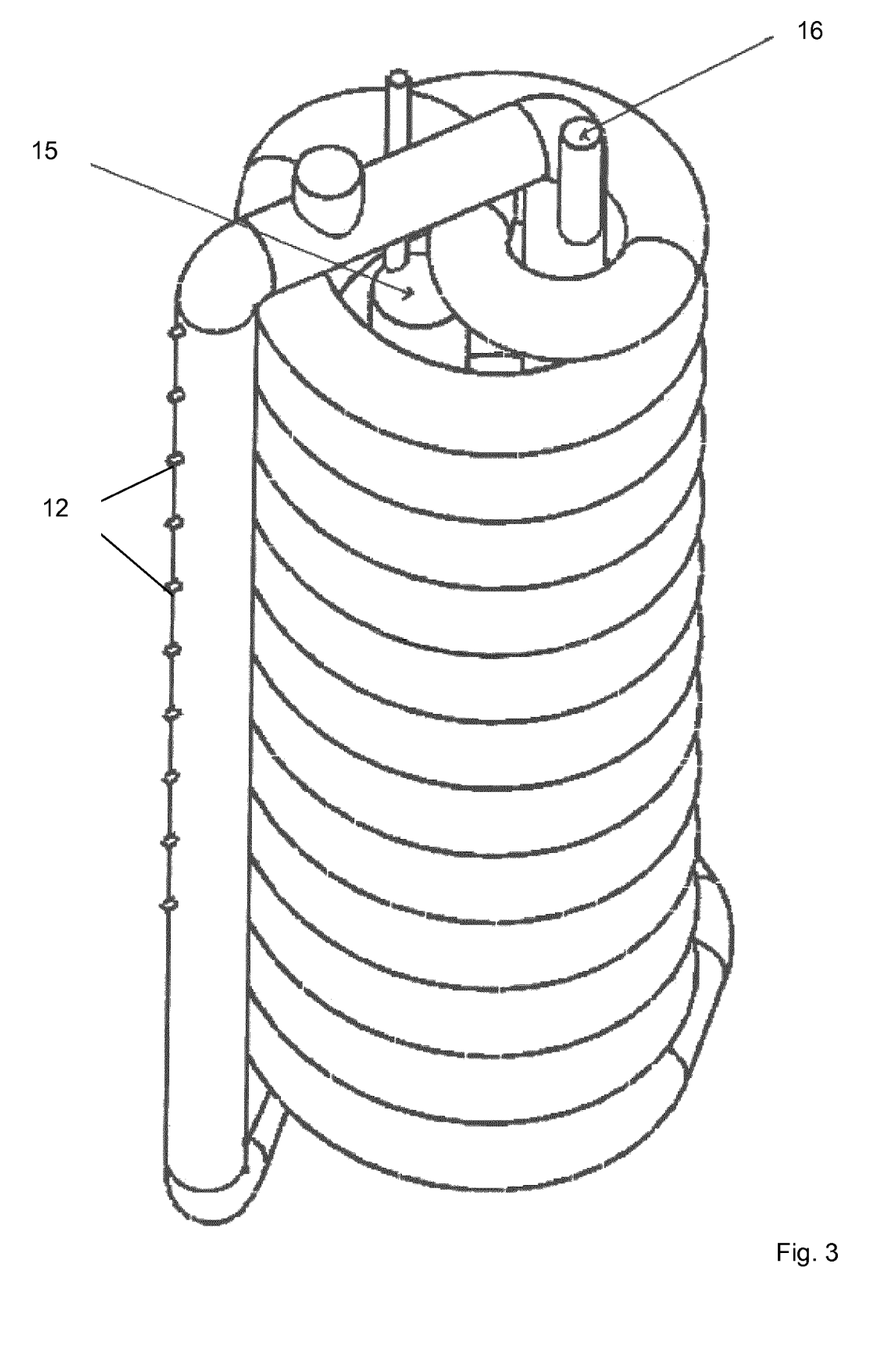
FIGS. 3-7 show details of the tube of the heating means.

FIG. 3 shows the location of the heating means 15 and the temperature sensor 16. The temperature sensor 16 in the block measures the temperature of the gas in the tube and/or the temperature of the block.

Figures 4, 5:
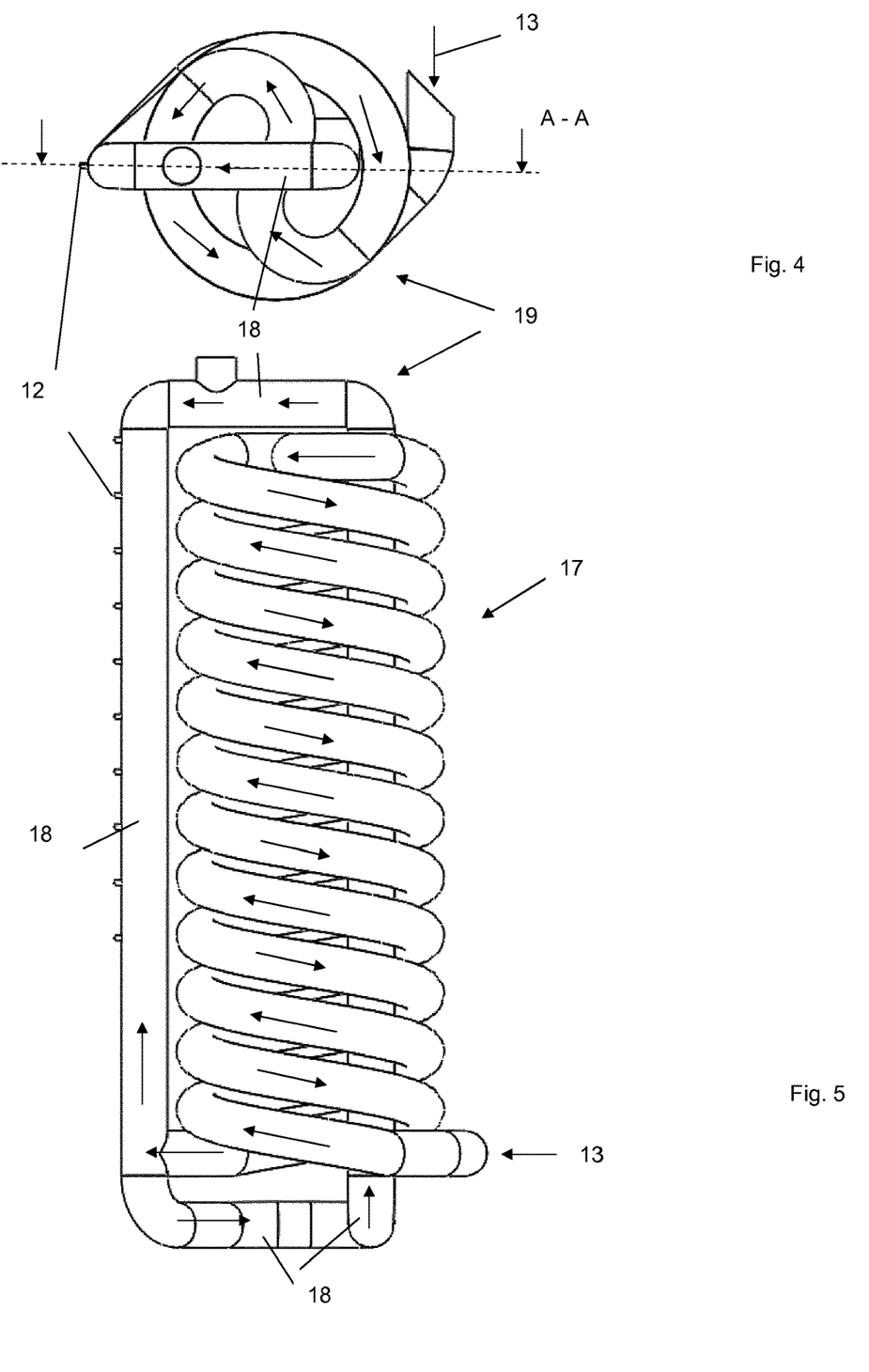
Figure 6:
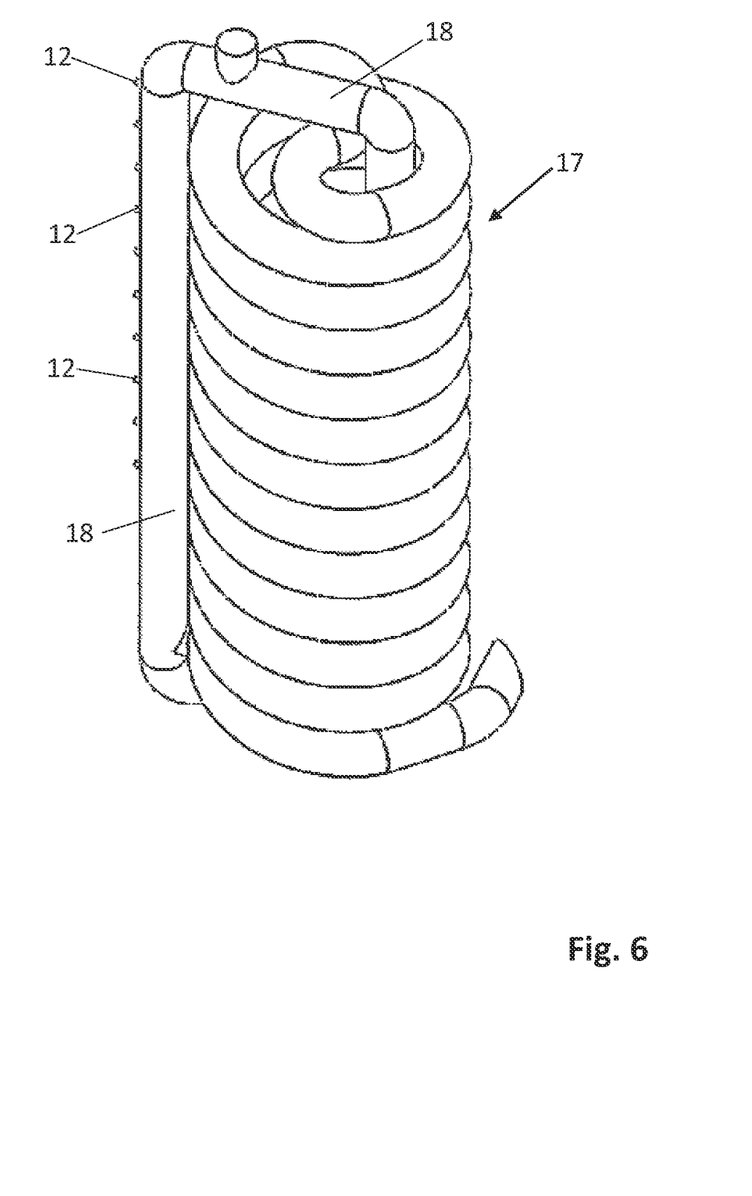
Figure 7:
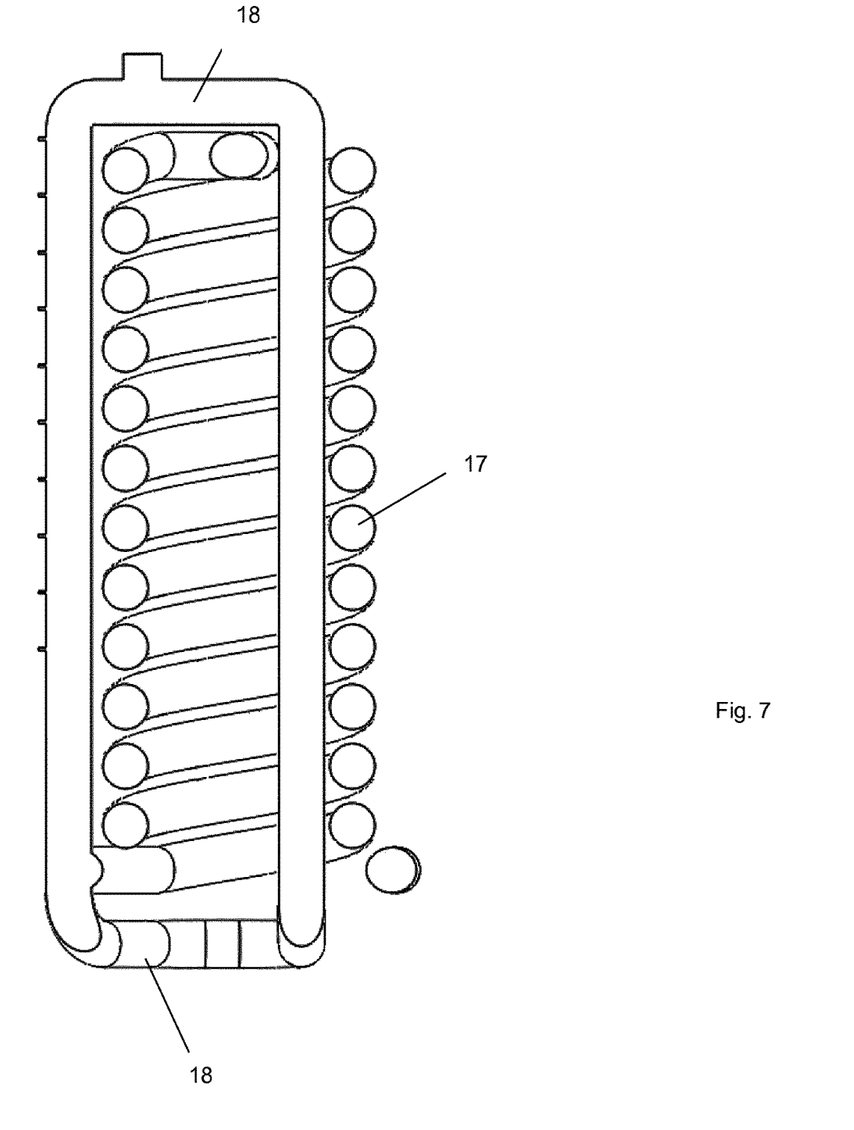

FIG. 7 a sectional view along the cut A-A depicted in FIG. 4. It can be clearly seen, that the pressure chamber 18 is designed as a closed loop.

Figure 8:
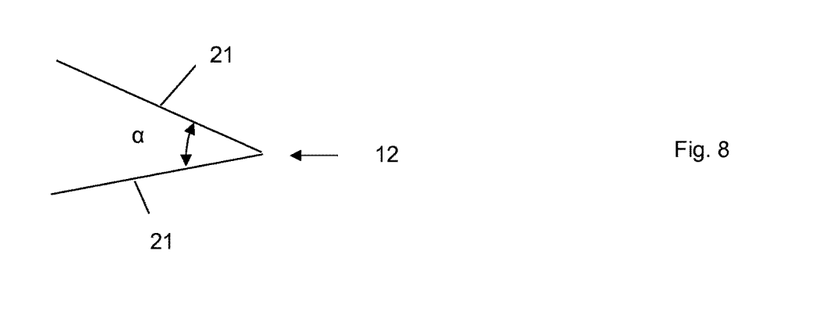
FIG. 8 depicts the planes around the nozzles.

FIG. 8 depicts details of the planes 21 around the outlet 12, here a nozzle 12, particularly the angle α between the two planes. Each outlet is framed by two planes. The planes are preferably provided to the left and to the right of each outlet and at an angle relative to each other. Preferably, the angle α is 90-130°, more preferably 92-120° and even more preferable 93-110°.

Preferably referring to all drawings, and particularly to FIG. 5, the form and/or number of nozzles 12 and/or the shape of the block, particularly its cross-section is preferably adapted to and/or designed for the individual application, e.g. in order to optimize the pressure, the flow and the flow distribution.

The following parameters can be changed
the shape of the nozzle, particularly its cross-section and/or shape, preferably at its outlet.
the diameter of the nozzle
the length of the nozzle
the outside surface of the block 10 adjacent to the nozzles 12
the angle α of the surface adjacent to the nozzles 12
number of holes
the distance between nozzles
distribution of the nozzles along the height H of.

Only one or a multitude of those adaptations can be carried out, wherein any combination of adaptations or modifications can be carried out for a certain application. Preferably, the changes are made at the computer and the changed block is then 3D-printed. Some adaptations, like the size, the number and/or the distribution of the nozzles can also be incorporated by machining, e.g. drilling.

LIST OF REFERENCE SIGNS

1 Packaging machine, flow wrapper, vertical flow-wrapper
2 form-fill tube
3 form shoulder
4 foil, film
5 longitudinal-sealing means
6 cross-sealing- and/or cutting means
7 package
8 frame/housing
9 heating means
10 block of solid state thermoconductive material
11 tube
12 outlet
13 inlet
14 separator
15 heating element
16 temperature sensor
17 spiral part
18 pressure chamber
19 end section
20 tip of the block (10)
21 plane
22 direction of movement of a film past the heating means (9)
α angle
H Height of the block

The invention claimed is:
1. Heating means comprising:
a heating element; and
a tube through which a medium to be heated is configured to flow, the tube comprises a first spiral tubular path and a second spiral tubular path;
wherein the tube is incorporated into a block of a solid-state thermal-conductive material,
wherein the medium is moved in a first direction through the first spiral tubular path and then the medium is moved in an opposite second direction through the second spiral tubular path;
wherein the heating means comprises a closed loop pressure chamber, and the medium flows from the tube through the closed loop pressure chamber in both directions, depending on a pressure distribution in the pressure chamber; and wherein a section of the tube is surrounded by spirals of the first spiral tubular path and spirals of the second spiral tubular path.

2. Heating means according to claim 1, wherein the block forms sidewalls of the tube.

3. Heating means according to claim 1, wherein the heating means comprises a multitude of outlets, which are incorporated into the block.

4. Heating means according to claim 3, wherein the outlets comprise a nozzle incorporated in the block.

5. Heating means according to claim 3, wherein each of the outlets are connected to the pressure chamber.

6. Heating means according to claim 1, wherein the heating means comprises a multitude of outlets, and each of the outlets are framed by two planes.

7. Heating means according to claim 6, wherein a minimum inner angle of the two planes is ≥90 degrees.

8. Heating means according to claim 6, wherein the two planes are provided at an angle so that a cross-section of the block has a triangular shaped region in a vicinity of the outlets, the outlets are at a tip of the triangular shaped region, and wherein the two planes extend parallel to a direction of motion of a film transported by a packaging machine that includes the heating means.

9. Packaging machine comprising the heating means according to claim 1, wherein the packaging machine is a vertical flow wrapper.

10. Heating means according to claim 1, wherein the medium is heated inside of the tube by heat transfer from side walls of the tube to the medium.

11. Heating means according to claim 1, wherein another section of the tube of the closed loop pressure means extends outside of the spirals of the first spiral tubular path and the spirals of the second spiral tubular path.

12. Heating means according to claim 11, wherein the heating means comprises a plurality of outlets, a cross section of the block has a triangular shaped region, and the outlets are provided at a tip of the triangular shaped region.

13. Heating means according to claim 1, wherein the heating means comprises a plurality of outlets, a cross section of the block has a triangular shaped region, and the outlets are provided at a tip of the triangular shaped region.

* * * * *